United States Patent [19]

Speed et al.

[11] Patent Number: 5,535,411
[45] Date of Patent: Jul. 9, 1996

[54] REDUNDANT COMPUTER SYSTEM WHICH BOOTS ONE SYSTEM AS THE PRIMARY COMPUTER FROM A SHARED DRIVE

[75] Inventors: Paul F. Speed, Sandbach; Richard N. Taylor, Congleton, both of England

[73] Assignee: International Computers Limited, London, United Kingdom

[21] Appl. No.: 401,962

[22] Filed: Mar. 10, 1995

[30] Foreign Application Priority Data

Apr. 28, 1994 [GB] United Kingdom ............... 9408405

[51] Int. Cl.$^6$ ............... G06F 15/00; G06F 15/76; G06F 9/445
[52] U.S. Cl. ............ 395/800; 395/180; 395/700; 395/570; 395/182.04; 364/DIG. 1; 364/230.4; 364/246.3
[58] Field of Search ............... 364/280.2, 280.3, 364/944.2; 395/570, 575, 700, 800, 182.04

[56] References Cited

U.S. PATENT DOCUMENTS

| | | | |
|---|---|---|---|
| H696 | 10/1989 | Davidson | 364/900 |
| 4,371,929 | 2/1983 | Brann et al. | 395/865 |
| 5,247,659 | 9/1993 | Curran et al. | 395/182.03 |
| 5,327,553 | 7/1994 | Jewett et al. | 395/575 |
| 5,379,431 | 1/1995 | Lemon et al. | 395/700 |

*Primary Examiner*—Mehmet B. Geokil
*Assistant Examiner*—Krishna Malyala
*Attorney, Agent, or Firm*—Lee, Mann, Smith, et al.

[57] ABSTRACT

A high-availability computer system comprises at least two processors, each having its own private disk drive, and a shared disk drive, accessible by both processors. Each of the private disk drives holds system files for establishing a processor as a secondary processor, and the shared disk drive holds system files for establishing a processor as a primary processor. When it boots up, each processor decides whether to use the system files from its private disk so as to become a secondary, or to use the system files from the shared disk so as to become the primary. As as result, after a system failure or reboot, either processor can pick up the characteristics of the the primary processor, and will have all the most up-to-date primary information available to it.

8 Claims, 1 Drawing Sheet

REDUNDANT COMPUTER SYSTEM WHICH BOOTS ONE SYSTEM AS THE PRIMARY COMPUTER FROM A SHARED DRIVE

BACKGROUND TO THE INVENTION

This invention relates to computer systems. More specifically, the invention is concerned with a high-availability computer system comprising two or more processors, one of which acts as a primary processor, and another of which acts as a secondary or backup processor. The intention behind such a system is that, if the primary processor fails, the secondary processor can take over the total identity of the failed processor, thus ensuring that there is no loss in availability of the system to the user. Typically, in such a system, each processor has its own private disk drive or drives, and the system also includes one or more shared disk drives which are shared between the processors.

The invention is particularly, although not exclusively, concerned with computer systems running under the UNIX operating system (UNIX is a trademark of Unix System Laboratories). Much of a UNIX system's identity is contained within the directory /etc, which is part of the root filesystem and is normally held on the processor's private system disk. This includes information about users and their passwords, the system's network address, details of which filesystems are currently mounted and available to the system, and the startup processes of specific applications. However, a problem with this is that, when the secondary processor takes over from a failed primary processor, it may not have the most up-to-date version of this information available on its private system disk. For example, if users have changed their passwords, the new password information will be available only on the system disk of the failed processor.

The object of the present invention is to provide a novel way of solving this problem.

SUMMARY OF THE INVENTION

According to the invention there is provided a computer system comprising:

(a) at least two processors, each having its own private disk drive; and (b) a shared disk drive, accessible by both said processors;

(c) wherein each of the private disk drives holds system files for establishing a processor as a secondary processor, and the shared disk drive holds system files for establishing a processor as a primary processor;

(d) each processor having means for deciding, when the processor is booted up, whether to use the system files from its private disk so as to become a secondary, or to use the system files from the shared disk so as to become the primary.

As will be seen, the invention allows either processor to pick up the characteristics of the primary processor, and any changes made to primary information (such as a user changing a login password) will be available to whichever processor is the primary.

DESCRIPTION OF AN EMBODIMENT OF THE INVENTION

One embodiment of the invention will now be described by way of example with reference to the accompanying drawings.

Figure 1:
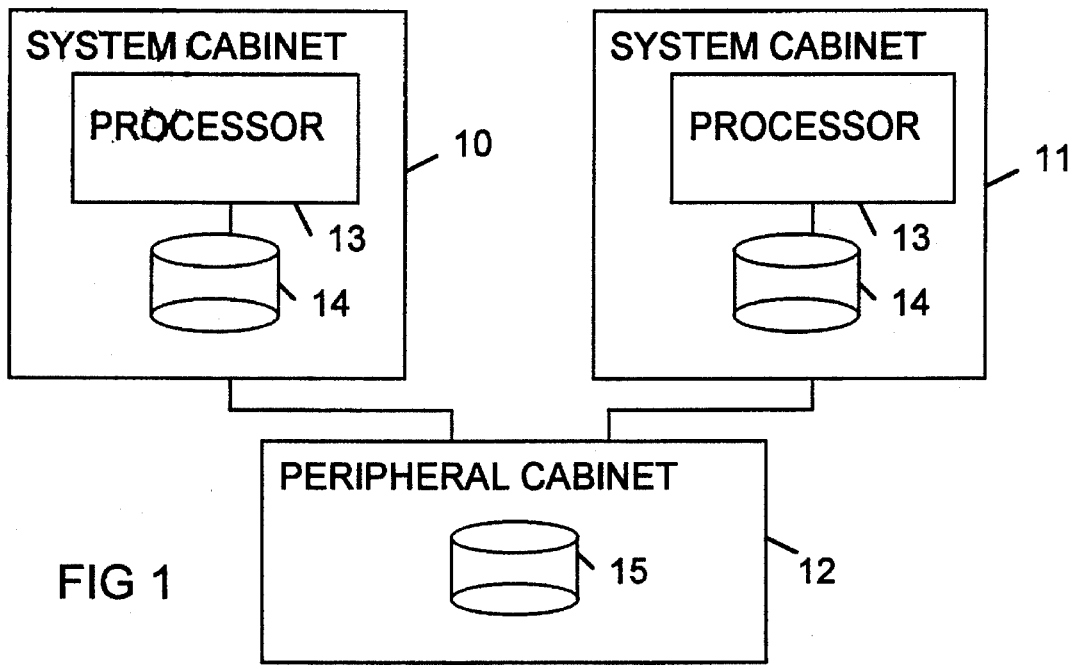
FIG. 1 is a block diagram of a computer system embodying the present invention.

Referring to FIG. 1, the system comprises two system cabinets 10,11 and a peripheral cabinet 12. Each of the system cabinets includes a processor 13 and one or more private disk drive units 14 accessible only by the local processor. Each processor runs under the UNIX operating system. The peripheral cabinet contains one or more shared disk drive units 15, accessible by either of the two processors. Each individual shared disk drive may be used by only one processor at a time.

In a conventional UNIX system, a special directory /etc holds a number of system administration files. These files include for example the /etc/inittab file, which controls the operation of the init program, and the /etc/rc2.d/ . . . files which control the startup of services and applications on that processor. In the present system, the /etc directory is moved from its normal position on each private disk, to become a directory /realroot/etc on the same disk. The files in this directory are used when the processor is acting as a secondary processor. The shared disk drives also hold a similar set of system administration files, in a directory /etc. The files in this directory are used when the processor acts as the primary processor.

Whenever one of the processors is closed down e.g. because it is to be powered down or rebooted, it performs a close-down sequence. During this sequence, the processor decides whether it is to become the primary processor during at the next bootup. For example, if the processor detects that the system is being rebooted because of failure of the other processor, it assumes that it should boot up as the primary processor next time. If the processor decides that it should become the primary at the next bootup, it creates a special dummy marker file on its local private disks to indicate this, before completing its close-down sequence.

Figure 2:
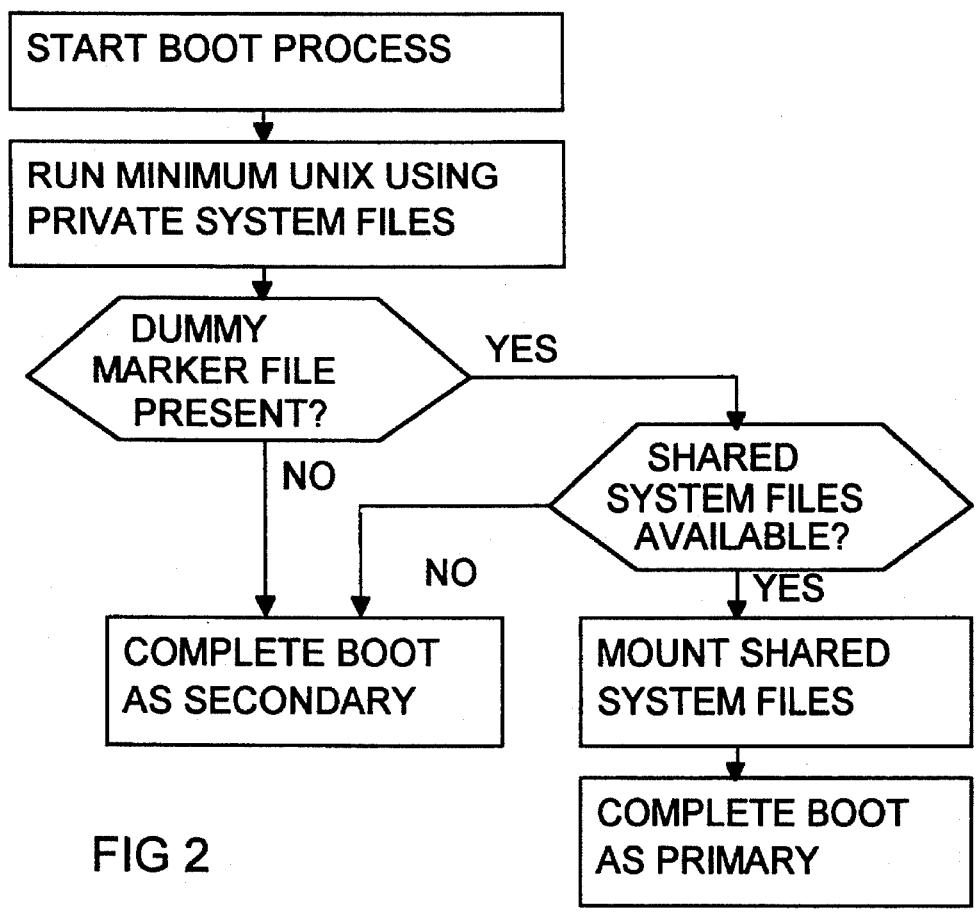
FIG. 2 is a flowchart showing a boot process performed by the processors in the system.

Whenever one of the processors is started up or rebooted it runs a boot process. The boot process is shown in FIG. 2.

The boot process first loads the UNIX kernel, and establishes itself as a bare minimum UNIX system. The boot process sets up a symbolic link, so as to map file names in the /etc directory invisibly on to the /realroot/etc directory. The system therefore runs at the bare minimum level using the system files in the /realroot/etc directory, on the local private disk.

At this stage, the boot process also starts up a special daemon process, referred to herein as the status daemon. The status daemons in the two processors attempt to establish contact with each other by way of a private area on the shared disks. Each daemon writes status information about its own processor into this private area, and attempts to read status information from the other daemon. In particular, this status information includes information about whether either of the processors is currently using the shared disk on which the shared system files are held.

The bare UNIX system then searches the local private disks to see whether a dummy marker file, indicating that the processor should assume the role of primary, is present. If no such dummy marker file is present, the processor completes its bootup process and assumes the role of secondary. If, on the other hand, the dummy marker file is present, the dummy marker file is deleted (so as to ensure that it cannot be used again) and the processor then attempts to assume the role of primary, as follows.

It is possible for the dummy marker files in the processors to be left in an inconsistent state as a result of a system crash. Specifically, it is possible that both processors may have such a dummy marker file present in their private disks. It is imperative that both processors do not attempt to access the system files on the shared disks concurrently, since this would result in major filestore corruption. To ensure against this, before the processor attempts to assume the role of primary, it sends a request to its local status daemon. In response to this request, the daemon checks to see whether the shared system files have already been claimed by the other processor. If the daemon indicates that the shared system files are not available (i.e. they have already been claimed by the other processor), then the processor completes its boot-up process and assumes the role of secondary. If the other processor is not running, the local status daemon recognises this, and deduces that any residual status information from the remote daemon is obsolete and that the shared system files are available for use by the local processor.

If, on the other hand, the daemon indicates that the shared system files are available, then the processor proceeds as follows. First, it mounts the /etc directory in the shared disks on to a special mount point called /root. It then changes the symbolic link, so as to map file names in the /etc directory on to the /root/etc directory. This means that the secondary /realroot/etc directory is not used, and the primary directory on the shared disk is used instead. The processor then completes its boot-up process as the primary processor, starting up the primary applications as defined in the etc/rc2.d/ . . . files on the shared disk.

In summary, it can be seen that the processor will either use the system files held in its own private disk, thus assuming the role of secondary, or else will use the system files held on the shared disk, thus assuming the role of primary.

We claim:

1. A fault-tolerant computer system comprising:
 (a) a first processor and a second processor;
 (b) a first private disk drive coupled to said first processor, said first private disk drive holding first system files for establishing said first processor as a secondary processor;
 (c) a second private disk drive coupled to said second processor, said second private disk drive holding second system files for establishing said second processor as a secondary processor; and
 (d) a shared disk drive, coupled to said first processor and also coupled to said second processor, said shared disk drive holding shared system files for establishing either said first or said second processor as a primary processor;
 (e) said first processor comprising:
  (i) means operative upon failure of said second processor, for creating an indication that said first processor is to be established as a primary processor;
  (ii) means for initiating a bootup process in said first processor, by first establishing a minimum operating system in said first processor, using said first system files from said first private disk drive, and then checking whether said indication that said first processor is to be established as a primary processor is present;
  (iii) means operative when said indication that said first processor is to be established as a primary processor is absent, for using said first system files from said first private disk drive for completing said bootup process in said first processor; and
  (iv) means operative when said indication that said first processor is to be established as a primary processor is present, for using said shared system files from said shared disk drive for completing said bootup process in said first processor;
 (f) and said second processor comprising:
  (i) means operative upon failure of said first processor, for creating an indication that said second processor is to be established as a primary processor;
  (ii) means for initiating a bootup process in said second processor, by first establishing a minimum operating system in said second processor, using said second system files from said second private disk drive, and then checking whether said indication that said second processor is to be established as a primary processor is present;
  (iii) means operative when said indication that said second processor is to be established as a primary processor is absent, for using said second system files from said second private disk drive for completing said bootup process in said second processor; and
  (iv) means operative when said indication that said second processor is to be established as a primary processor is present, for using said shared system files from said shared disk drive for completing said bootup process in said second processor.

2. A system according to claim 1 wherein the system includes interlock means for ensuring that both said processors do not simultaneously use said system files on said shared disk.

3. A system according to claim 2 wherein each of said processors runs under the UNIX operating system.

4. A system according to claim 3 wherein initially each of said processors forms a symbolic link to map file names in the /etc directory on to the system files in its private disk drive.

5. A system according to claim 4 wherein, when a processor decides to use said system files on the shared disk, it mounts the filesystem containing those files on a predetermined mount point and then modifies said symbolic link to map file names in the /etc directory on to the system files on the shared disk drive.

6. A system according to claim 1 wherein each of said processors runs under the UNIX operating system.

7. A system according to claim 6 wherein initially each of said processors forms a symbolic link to map file names in the /etc directory on to the system files in its private disk drive.

8. A system according to claim 7 wherein, when a processor decides to use said system files on the shared disk, it mounts the filesystem containing those files on a predetermined mount point and then modifies said symbolic link to map file names in the /etc directory on to the system files on the shared disk drive.

* * * * *